Aug. 26, 1958 M. KUTS 2,848,841
TOOL FOR USE IN TREE GIRDLING AND GRAFTING
Filed Feb. 5, 1957

INVENTOR.
MATHEW KUTS
BY C. E. Tripp
ATTY.

United States Patent Office 2,848,841
Patented Aug. 26, 1958

2,848,841

TOOL FOR USE IN TREE GIRDLING AND GRAFTING

Mathew Kuts, Akron, Ohio, assignor to The B. F. Goodrich Company, New York, N. Y., a corporation of New York Application February 5, 1957, Serial No. 638,360

2 Claims. (Cl. 47—1)

This invention relates to a tool for use in a tree grafting process, the tool being used for removing a narrow width of bar around the circumference of the parent tree in the grafting operation. For example, in rubber plantations wherein the plant or tree *Hevea brasilliensis* is used as a source of rubber latex, it is customary to graft shoots of high producing varieties upon the trunk of well-established vigorous trees. The trunk of the parent tree above the graft is eventually killed by removing a band or strip of bark around its circumference after the grafts are established. This is done rather than cutting off the upper portion of the tree in order that the upper portion can serve as a stay for the fragile shoots until they are well established on the lower portion of the parent tree. The tool of this invention is a simple, quickly manipulated device that positively removes all of the bark of the desired band width so that there is no danger that the wound to the tree will heal and re-establish growth of the top branches of the parent tree.

The tool of this invention has opposed cutters which are relatively movable so that they can be pressed against the trunk to remove the desired width of bark. One set of cutters is in the form of axially spaced rotating cutter discs that score the bark at the margins of the band to be removed and the other is in the form of a pair of elongated generally cylindrical cutters each having a sharp helical edge, the edges being of opposite pitch. The tool is rotated around the tree with the cutters pressing against the bar. The helical cutters comminute the bark into diamond-like shreds while urging the shreds back and forth axially along the tree so that they are cleanly and totally removed from the tree in one or more revolutions of the tool about the tree.

Figure 1:
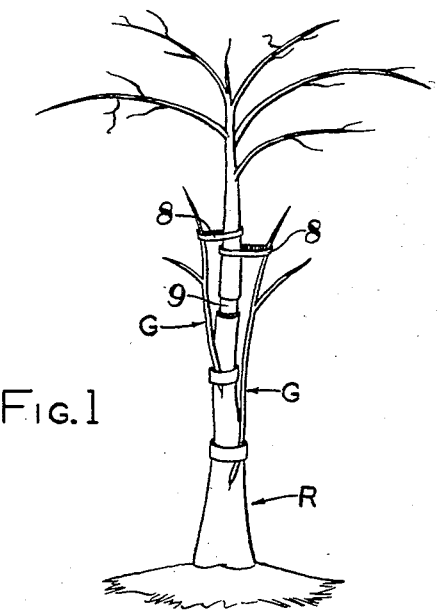
Figure 4:
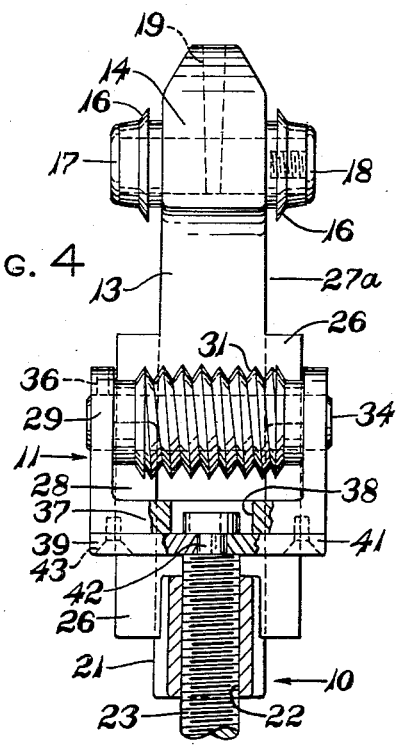
Figure 2:
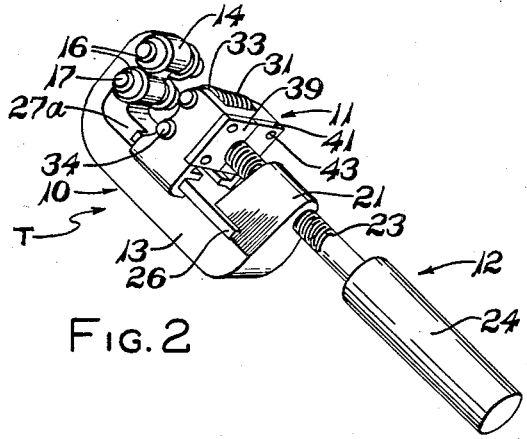
Figure 5:
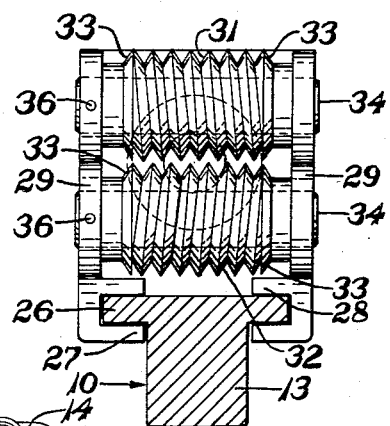
Figure 3:
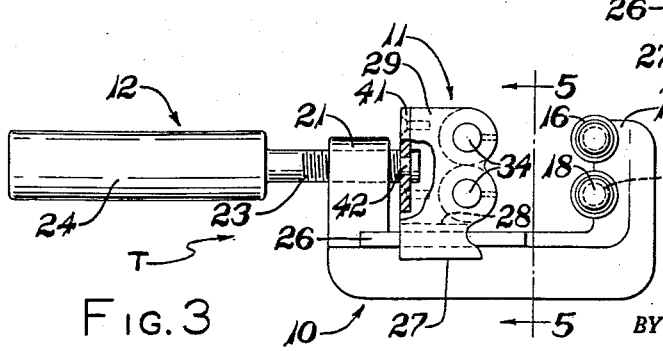

The manner in which this invention may be practiced by one skilled in the art and the following description of the preferred embodiment thereof:

In the drawings, Fig. 1 shows a tree graft made with the tool of this invention. Fig. 2 is a perspective view of a tool embodying the invention. Fig. 3 is a side view thereof. Fig. 4 is a plan view of the tool, and Fig. 5 is a section taken on 5—5 of Fig. 3.

Referring to Fig. 1, the parent rubber tree R is shown with two grafted shoots G supported by the upper part of the trunk of the parent tree by stay members 8. A width of bark has been removed from the parent tree at 9, above the grafted areas. The trunk disposed above the bark serves as a support for the graft shoots until they have grown enough to be self-supporting. In the mean time, the parent tree above the band 9 dies and eventually blows away or breaks off.

Referring to Figs. 2–5, tool T has three major elements, a frame member 10, a cutter support 11 slideable on the member and an adjustable end handle member 12 threaded in the frame member 10. The frame is of C shape in side elevation and has a base portion 13 from which extends a fixed cutter support portion 14. Two pairs of disc-like cutters 16 are rotatably mounted on pins 17 that extend through the frame, the cutters being retained on each pin by a fixed head at one end and a removable screw head 18 threaded to the end of the pin. The pins may be fastened to the frame by tapered pins 19.

The sliding cutter support 11 is adjusted by means of the handle 12 which is threaded into a projection 21 of the frame by means of internal threads 22 and external threads 23 on the shank of the handle. The handle has an enlarged portion 24 for easy manipulation. The frame as a pair of axially extending guides 26 which are engaged by opposite feet 27 and 28 formed on the sliding cutter support 11. The guides 26 are interrupted as at 27a, Fig. 4, to permit the slide to be assembled with the frame. The slide has upstanding portions 29 upon which are mounted helical cutters 31 and 32, these cutters being flanked by disc-like cutters 33. The cutter assemblies are rotatably mounted on pins 34 which are pinned by pins 36 to one of the upstanding flanges 29 of the slide. The combined handle and adjusting member 12 is attached to the slide after it has been slipped into place in the frame. The slide has a rearward flange 37 apertured as at 38 to receive the head of the handle. A pair of fastening plates 39 and 41 are screwed to the slide, each plate having a semicircular notch formed therein to receive the necked down portion 42 of the handle. The assembly is completed by fastening the plate to the slide by means of screws 43.

In operation, the slide is adjusted to receive the branch or trunk of the tree or plant whereupon the handle is turned to press the cutters against the branch. The tool is rotated once or twice around the trunk of the tree and the rotatable cutting knives 16 and 33 make score marks which define the width of bark to be removed. The helical cutters each cut into the bark and one of the cutters tends to urge the bark that has been severed in one direction as the other urges the bark in the opposite direction so that the small pieces of bark have forces applied to them that tend to work them one way or the other along the axis of the cutters. These small pieces are, therefore, freed of the woody part of the tree so that after one or two revolutions no bark remains between the score marks. If necessary, handle 12 can be rotated during the cutting operation to maintain adequate pressure of the cutters against the bark. With this tool, the entire area of bark between the score marks is removed rapidly and easily with the assurance that there can be no healing of the tree so that the part above the scored area will eventually wither and die.

Having completed a detailed description of the preferred embodiment of this invention so that one skilled in the art may practice the same, I claim:

1. A tool for removing a width of bark around the circumference of a woody plant or tree comprising a frame, a first cutter support mounted on said frame, a second cutter support mounted on said frame, means for providing relative motion of said cutter supports toward and away from one another, two pairs of axially spaced cutters rotatably mounted on one of said supports, an axially elongated cutter rotatably mounted on said other cutter support, opposite each pair of axially spaced cutters. said elongated cutters having reversely pitched helical cutting edges, said helical cutting edges comminuting and removing the bark of a plant or tree between circumferential score marks made by said axially spaced cutters as said tool is rotated around the plant or tree with said cutters pressing against the bark thereof.

2. A tool for removing a width of bark around the circumference of a woody plant or tree comprising a frame, a first cutter support mounted on said frame, a second cutter support mounted on said frame, means for providing relative motion of said cutter supports toward and away from one another, two pairs of axially spaced cutting discs rotatably mounted on one of said supports, an axially elongated cutter rotatably mounted on said other cutter support opposite each pair of cutting discs, said elongated cutters having reversely pitched helical cutting edges, a cutting disc rotatably mounted on each end of said elongated cutters, said helical cutting edges comminuting and removing the bark of a plant or tree between circumferential score marks by said axially spaced cutting discs as said tool is rotated around the plant or tree with said cutters pressing against the bark thereof.

References Cited in the file of this patent

UNITED STATES PATENTS

| | | |
|---|---|---|
| 2,588,903 | Akins | Mar. 11, 1952 |
| 2,655,763 | Grissett | Oct. 20, 1953 |

UNITED STATES PATENT OFFICE
CERTIFICATE OF CORRECTION

Patent No. 2,848,841                          August 26, 1958

Mathew Kuts

It is hereby certified that error appears in the printed specification of the above numbered patent requiring correction and that the said Letters Patent should read as corrected below.

Column 1, line 17, for "bar" read -- bark --; column 2, line 9, for "frame as" read -- frame has --; line 59, for "cutters." read -- cutters, --.

Signed and sealed this 6th day of January 1959.

(SEAL)
Attest:

KARL H. AXLINE
Attesting Officer

ROBERT C. WATSON
Commissioner of Patents